United States Patent [19]
Taplin
[11] 4,337,839
[45] Jul. 6, 1982

[54] MEANS FOR IMPROVING AUTOMOBILE DRIVEABILITY

[75] Inventor: Lael B. Taplin, Bloomfield Hills, Mich.

[73] Assignee: The Bendix Corporation, Southfield, Mich.

[21] Appl. No.: 164,669

[22] Filed: Jun. 30, 1980

Related U.S. Application Data

[60] Division of Ser. No. 14,660, Feb. 23, 1979, abandoned, which is a continuation-in-part of Ser. No. 863,634, Dec. 22, 1977, abandoned.

[51] Int. Cl.3 ...................... B60K 31/00; F02D 11/10
[52] U.S. Cl. .................................. 180/179; 123/357; 364/426; 180/335
[58] Field of Search ............... 180/170, 178, 179, 335; 123/336, 340, 341, 342, 361, 352, 357, 403; 364/426; 361/239, 242, 326, 329

[56] References Cited

U.S. PATENT DOCUMENTS

| | | | |
|---|---|---|---|
| 3,886,915 | 6/1975 | Taplin | 123/102 |
| 3,983,954 | 10/1976 | Noddings | 180/179 |
| 4,046,213 | 9/1977 | Larson | 180/177 |
| 4,077,370 | 3/1978 | Spangenberg | 123/103 C |
| 4,112,885 | 9/1978 | Iwata | 123/102 |
| 4,181,103 | 1/1980 | Sturdy | 123/102 |
| 4,192,398 | 3/1980 | Hunt | 123/361 |
| 4,244,023 | 1/1981 | Johnson | 123/340 |

FOREIGN PATENT DOCUMENTS

| | | | |
|---|---|---|---|
| 1437083 | 5/1976 | United Kingdom | 180/179 |

*Primary Examiner*—David M. Mitchell
*Attorney, Agent, or Firm*—Markell Seitzman; Russel C. Wells

[57] ABSTRACT

An open loop adaptive control system for improving the driveability of a vehicle having at least one air supply modulator such as a throttle. The control system generating a correction signal supplied to the air supply modulator wherein the correction signal when added to the operator commanded signal input to the air supply modulator is such as to cancel the speed and pressure variability of the engine and vehicle dynamics and substitute for these dynamics determinable vehicle control dynamics therein improving the driveability of the vehicle by establishing uniform performance.

14 Claims, 7 Drawing Figures

MEANS FOR IMPROVING AUTOMOBILE DRIVEABILITY

CROSS REFERENCE TO OTHER APPLICATIONS

This application is a divisional application of the abandoned U.S. patent application Ser. No. 14,660 filed Feb. 23, 1979 which is a continuation-in-part of the abandoned U.S. patent application Ser. No. 863,634, filed Dec. 22, 1977.

BACKGROUND AND SUMMARY OF THE INVENTION

The present invention relates to a throttle control for improving the driveability of an automobile.

Virtually every driver of an automobile has observed that as the speed of the vehicle increases, the engine becomes less responsive to demands made upon it to further increase the vehicle speed. As a result, the average driver customarily causes the throttle to open an excessive amount when a speed increase is desired causing the vehicle speed to overshoot. The driver then eases off the throttle, again usually excessively, so that the vehicle speed undershoots the desired speed, again requiring the driver to increase the throttle opening. Experienced drivers are so accustomed to this phenomenon that they perform without conscious effort the necessary hunting action to achieve the proper throttle opening to produce the desired vehicle speed. If they were relieved of this burden, drivers would experience less fatigue on long trips and would gain the impression that the performance of their car was greatly improved and would be less inclined to buy and operate overpowered automobiles.

It has been determined through linear mathematical analysis of an engine-transmission-chassis automobile model that the transfer function between vehicle speed N (output) and throttle command O (input) can be represented by a LaPlace transform of the form:

$$\frac{K}{(T_1S+1)(T_2S+1)}$$

To one versed in control system synthesis, this transform typifies a second order lag network. In the case of an automobile, however, the coefficients $T_1$ and $T_2$ are not constants but are each variables. As will be shown $T_1$ is substantially smaller than $T_2$ and varies inversely as vehicle speed. $T_2$, the larger coefficient, varies directly as vehicle speed and inversely as manifold pressure.

The concept of the present invention is based upon the recognition of the variable nature of the response of an automobile to changes in the speed command, the identification of the factors which create such variability of response, and the realization of means for modifying the speed command to the automobile engine in such a manner that the variability of response is practically eliminated. It is to be emphasized that the purpose of the invention is not to increase the performance of the vehicle in terms of maximum acceleration or modify exhaust emission controls, but to improve its driveability. That is, the invention will eliminate the vehicle's variable response and hence eliminate the necessity for the vehicle operator to hunt for the proper throttle setting to achieve the desired vehicle speed. The overall vehicle response then, becomes predictable.

More concisely, it is an object of the present invention to control with greater certainty, the throttle movement required to produce a desired vehicle speed.

A related object of the invention is to provide a vehicle speed control system which will relieve the operator of strain and annoyance during operation of the vehicle under varying conditions imposed by traffic or by the road.

Briefly, the invention comprises, in an automotive vehicle, means for sensing the vehicle speed, or related variable such as engine speed, means for sensing the engine manifold pressure and means for sensing the throttle angle commanded by the vehicle operator. A servo-mechanism is interposed in the linkage between the vehicle throttle control, which may be an accelerator pedal, and the throttle so that movement of the throttle is modified in a determinable manner. The modification to the throttle position commanded by the operator includes adjustment of the amplitude thereof by a factor comprising the quotient of the vehicle speed divided by the manifold pressure. More particularly, the throttle command, is adjusted in amplitude to include the effects of speed, manifold pressure and other engine parameters, then differentiated and added to the operator set throttle command for application to the engine throttle. By modifying the throttle command in this manner, the variable vehicle response to transient throttle command is replaced by a determinable response thus improving vehicle driveability. A further embodiment of the present invention illustrates its applicability to an engine equipped with a dual throttle.

DETAILED DESCRIPTION OF THE DRAWINGS

Figure 1:
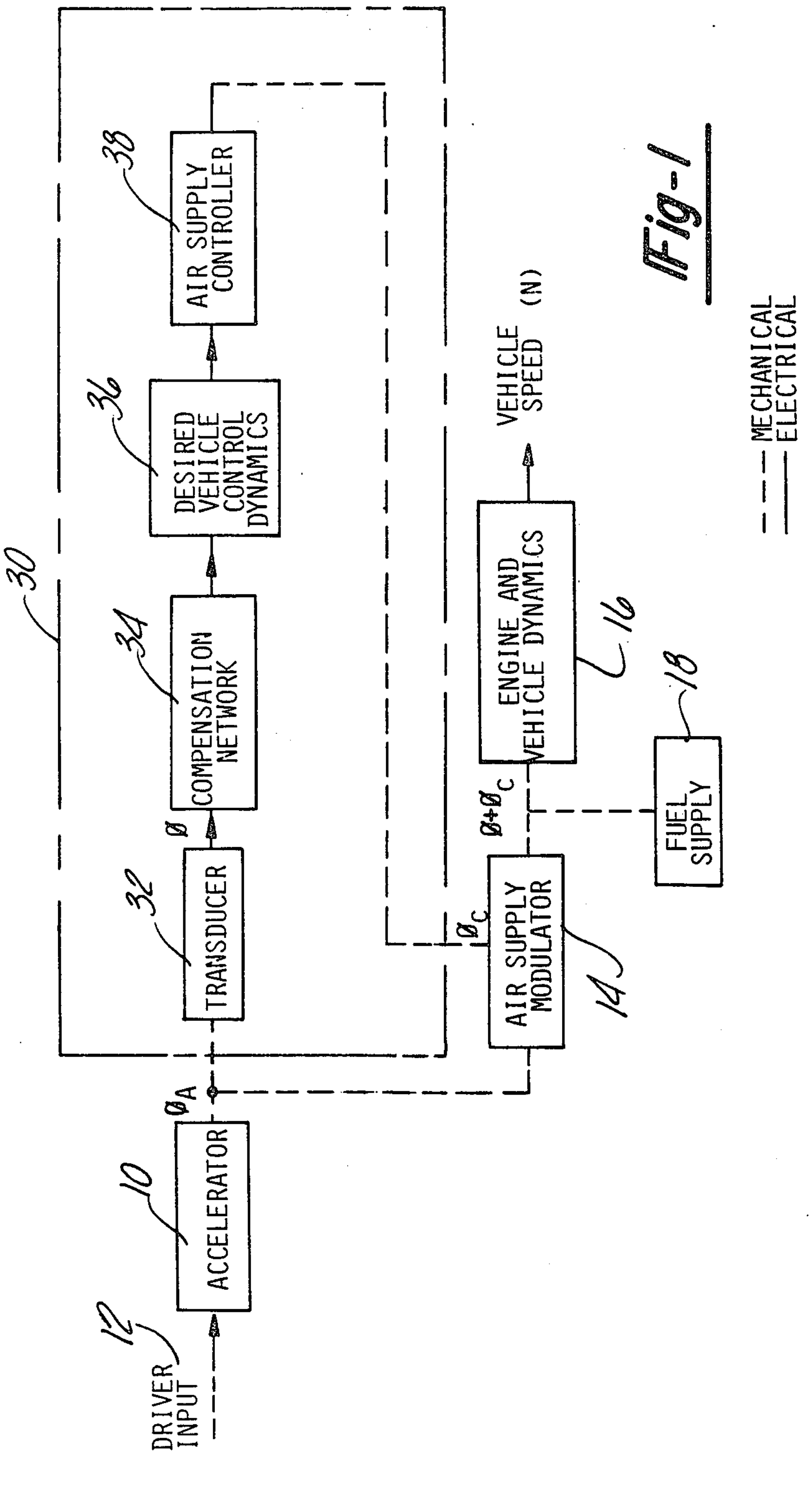
FIG. 1 is a block diagram incorporating features of the present invention.

Reference is now made to FIG. 1 which shows in part an air fuel supply system for an engine. In particular there is shown an accelerator 10 which is responsive to driver controlled inputs 12. The accelerator is mechanically connected to an air supply modulator 14. One skilled in the art will appreciate that if the engine to be controlled is an internal combustion engine, the air fuel modulator 14 may comprise the throttle of a carburetor or the throttle of a throttle body used in an electronic fuel injected engine. The air supply modulator 14 in response to accelerator motion regulates the amount of air flowing into the engine 16. The output of the air supply modulator 14, that is, the amount of air going into the engine 16, determines the amount of fuel delivered from the fuel supply 18 to the engine 16. Using the above enumerated components 10, 14, 16 and 18, the driver of a conventional automobile can control the speed of his automobile by depressing his accelerator a predetermined amount. It should be appreciated by one skilled in the art that the vehicle's speed response to driver input is a variable quantity, that is, the engine and associated vehicle dynamics 16 are not constant for all operating conditions. In particular, the engine and vehicle dynamics may be characterized at a minimum as a function of speed and manifold pressure.

Figure 2:
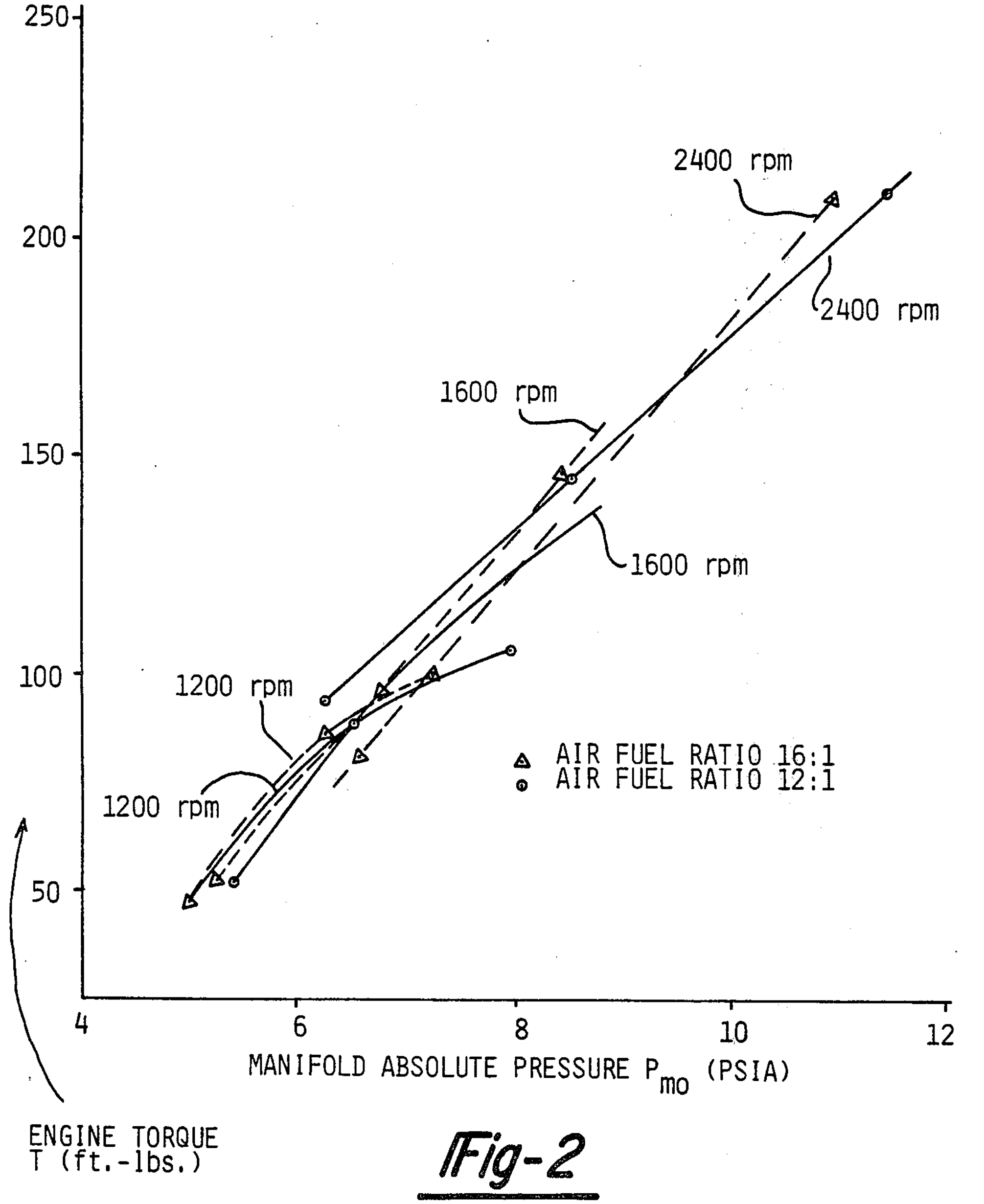
FIG. 2 is a graph showing engine output torque as a function of manifold absolute pressure and engine speed.

Reference is now made to FIG. 2, which is a graph illustrating the relationship between manifold absolute pressure $P_{mO}$ and torque (T), that is the torque developed by an engine. The developed torque is parametrically shown as a function of engine speed $N_o$ in revolutions per minute (rpm). FIG. 2 reflects test data taken from a Ford V8 engine having a cubic inch displacement of 429 cubic inches. In additon to illustrating the speed dependency of the torque-map curves, FIG. 2 also illustrates the relationship between the torque-map curves as a function of the air fuel ratio. At this point it would be beneficial to define the variable $D_{mt}$. $D_{mt}$ is termed torque defined displacement of the engine and may be defined as the partial derivative of torque with respect to manifold pressure. As can be seen from FIG. 2, the variable $D_{mt}$ does not change much with air fuel ratio. Rather, the effect the changing the air fuel ratio is to cause an incremental change in torque. Similarly, it would appear that engine speed has little affect on $D_{mt}$.

Consider now an engine vehicle 16 which may be an internal combustion engine of the type which may be characterized by the following dynamic transfer function as shown in equation 1.

$$\frac{N}{\theta_A} = \frac{N}{\theta} = \frac{\frac{kn}{k+n}}{\left(\frac{V}{kD_{mv}N_o} S + 1\right)\left(\frac{nN_oJ}{(k+n)P_{mo}D_{mt}} S + 1\right)} \tag{1}$$

wherein:

N = vehicle speed
$\theta$ = throttle angle
A = accelerator position
k = ratio of specific heat for air
n = automatic transmission efficiency
V = intake manifold volume
$D_{mv}$ = volumetric displacement of engine
$N_o$ = quiescent vehicle speed
J = total moment of inertia of vehicle and engine
$P_{mo}$ = quiescent intake manifold pressure
$D_{mt}$ = torque defined displacement of the engine
S = LaPlace operator Inspection of equation 1 will reveal that it can be written in a normalized form, such as a second order lag network and may be rewritten as equation 2.

$$\frac{N}{\theta} = \frac{E_o}{Ei} = \frac{1}{(T_1S + 1)(T_2S + 1)} \tag{2}$$

It is apparent from equation 1 and equation 2, that the time constants which describe the dynamic response of the engine/vehicle 16 are functions of speed, pressure, inertia, etc.

A further inspection of the equation 1 reveals that the time constant $T_2$ is by far the largest and the most grossly variable time constant resulting from speed and manifold absolute pressure changes. The dynamics associated with the time constant $T_1$, however, are of lesser importance and will not be compensated for in the preferred embodiment. However, it is apparent that a more complicated or a more complex control system can be fabricated by compensating for both the variability in time constants $T_1$ and $T_2$.

The discussion will now continue detailing those steps necessary to implement a compensation control system 30 required to compensate for the speed and the pressure dependency of the engine dynamics. That is, to compensate for the variable time constant $T_2$.

Reference is again made to FIG. 1, which illustrates a control system for improving the driveability of a vehicle during changing or transient operating conditions. The controller, or control system as previously mentioned, will counteract the variable vehicle time response so that the engine/vehicle 16 response is more uniform at all speeds and levels of manifold pressure.

The control system 30 comprises an accelerator position transducer 32 which transduces the mechanical position of the accelerator pedal into a measurable electrical voltage. The output of transducer 32 is input into compensation network 34. The purpose of the compensation network 34, which will be discussed later, is to compensate for the variability in the engine and vehicle dynamics 16. The output of compensation network 34 is input into block 36 which represents the desired vehicle dynamics which may in themselves be a function of speed, altitude, gear ratio, etc.

The output of block 36 is input to an air supply controller 38. The air supply controller 38, as will be shown shortly, is an electro-mechanical apparatus. The output of the air supply controller 38, $\theta_c$, is a correction to the amount of air entering the engine and may represent a correction angle $\theta_c$ to adjust the driver set throttle position. As shown in FIG. 1, the output of the air supply controller is input into the air supply modulator 14.

It is important to realize that the control system 30 used should not change the engine air-fuel ratio as it is presumed that this air-fuel ratio will have been set by a cooperating fuel management system for best exhaust gas emissions. Consequently, it is necessary for the control system 30 to make corrections by adjusting engine air flow while the cooperating fuel control system provides the proper air-fuel ratio.

Consider now the following discussion which is directed to develop the compensation network 34 once the desired vehicle dynamics 36 have been specified. As an example, let the desired vehicle dynamic characteristics (block 36) be defined by a single order lag network having a time constant T, such as described in equations 3 and 3a, wherein $N_{vd}$ is the desired speed response of the vehicle and E is a scaling factor based upon transmission efficiency.

$$N_{vd} = \frac{E\theta}{TS + 1} \tag{3}$$

$$\text{where } E = \frac{n}{1 + \frac{n}{k}} \tag{3a}$$

Upon eliminating the time constant $T_1$, the engine dynamics as shown in the equation 3*a* can also be represented by a single order lag having a time constant of $T_e$. By equating the desired engine response to the actual engine response, it is possible to obtain the form of the desired transfer function characteristics of the control system 30, that is the relationship between the corrected throttle angle $\theta_c$ and the driver commanded throttle angle $\theta$, so that when the corrected angle $\theta_c$ is added to the throttle angle $\theta$, the variable time constant $T_e$ of the engine is cancelled and replaced by the known desired functional dynamic characteristic, thus controlling the response of the vehicle.

Equating the actual engine response to the desired response, as shown in equation 4a $$\frac{E(\theta+\theta_c)}{T_eS+1}=\frac{E\,\theta}{TS+1} \tag{4a}$$

where:

$$T_e=\frac{n\,N_oJ}{P_{mo}\,D_{mt}\,(k+n)} \tag{4b}$$

enables the solution of the throttle connection $\theta_c$ in terms of operator set throttle angle $\theta$. It is apparent that the accelerator position $\theta_A$ is functionally related to the throttle angle $\theta$, hence, equation 4a could alternatively be written in terms of $\theta_A$.

Solving for the correction angle $\theta_c$ yields the desired transfer function relating $\theta_c$ and $\theta$ as shown in equation 4c.

$$\frac{\theta_c}{\theta}=\frac{\left(\frac{T_e}{T}-1\right)ST}{1+ST} \tag{4c}$$

Substituting equation 4b into 4c yields the final form of control system 30 as shown in equation 5.

$$\frac{\theta_c}{\theta}=\frac{\left(\frac{n\,N_oJ}{TP_{mo}\,D_{mt}\,(k+n)}-1\right)ST}{1+ST} \tag{5}$$

Inspection of equation 5 reveals the form of the compensation network necessary to satisfy the desired control system characteristics. More particularly, equation 5 reveals that the control system 30 can be characterized as another transfer function having a numerator and denominator which are both a function of LaPlace operator S. The denominator of equation 5 is comprised of a single order lag network having a time constant T. Further inspection of the numerator of the equation 5 reveals a term of the form ST which is easily recognized as a differentiation. The significance of the resulting differentiation is that the correction angle $\theta_c$ is only introduced into the system under changing or transient conditions. Finally, the numerator of equation 5 comprises a term within the brackets which is a function of pressure, speed, moment of inertia, etc.

Furthermore, one skilled in the art will appreciate the significance of the term (−1) which electrically compensates for the operator set mechanical throttle angle.

The relationship between the total throttle angle motion with respect to the motion of the accelerator can now be given as shown in equation 6.

$$\frac{\theta_T}{\theta_A}=\frac{\left(\frac{k\,N_oJS}{(k+n)\,D_{mt}\,P_{mo}}\right)+1}{1+ST} \tag{6}$$

Finally, multiplying equation 6 by the transfer function of the engine vehicle dynamics as given in equation 1 and neglecting the time constant associated with the lag term $T_1$, yields the driver-control system engine vehicle dynamics given by equation 7. As can be seen, the variable dynamics of the engine as given by equation 1 can now be replaced by known and determinable dynamics as given by equation 7 for all operating conditions.

$$\frac{N}{\theta_A}=\frac{\frac{kn}{k+n}}{(TS+1)} \tag{7}$$

It can be seen that once the form of the control system 30 is defined its implementation can be affected in a straight forward manner. The elements of equation 5 can be implemented using either standard analog or digital technology.

Figure 3:
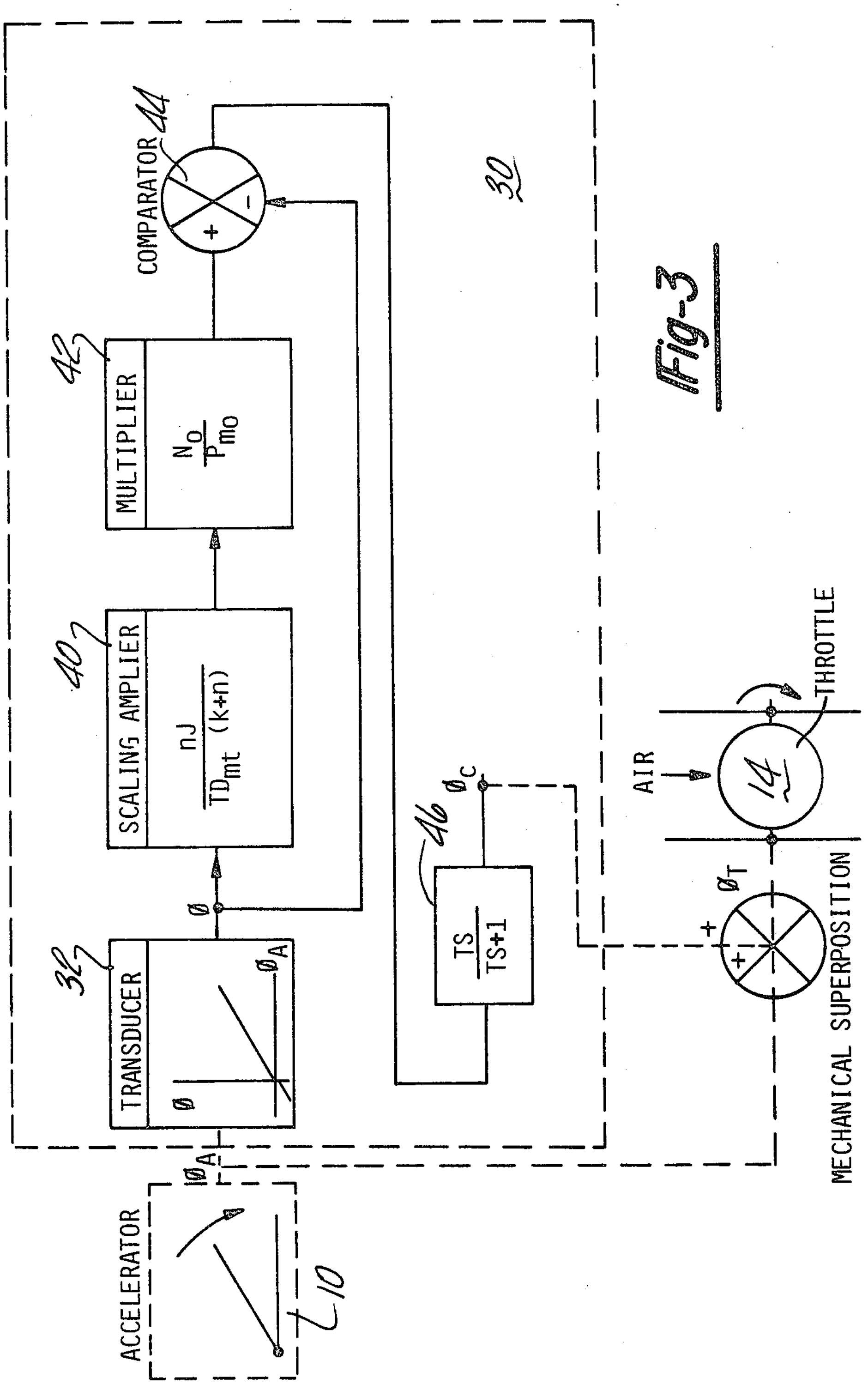
FIG. 3 is a more specific embodiment of the present invention adapted to control an engine equipped with a single throttle.

Reference is now made to FIG. 3 which illustrates one mechanization to achieve the control system 30. The accelerator 10 is connected to a transducer 32 which transduces the mechanical accelerator pedal motion into an electrical signal which is indicative of the throttle angle $\theta$, i.e., the motion of an uncorrected throttle. In essence, the transducer 32 inversely reflects the mechanism throttle linkage. The transducer 32 can be a potentiometer reflecting a linear relationship or can be a non-linear function generator if the throttle angle $\theta$ and accelerator are related in a non-linear manner.

A scaling means such as amplifier 40 scales the output of the transducer 32 in accordance with equation 5. A multiplier 42 scales the output of amplifier 40 to reflect the speed-pressure dependency. The output of the multiplier 42 and the output of the transducer 32 are input to comparator 44. The output of comparator 44 drives a differentiating servo-mechanism 46; the output of which is $\theta_c$. This output is mechanically coupled to the throttle 14 so that the total throttle angle is the composite of the operator set angle and the correction introduced by the control system 30.

To achieve the ideal compensation for the vehicle dynamics necessitates implementing a control system which is adaptive, adaptive in the sense that the control system 30 takes into account changes in the vehicle and engine parameters such as speed $N_O$, pressure $P_{mO}$, inertia J, engine efficiency n, etc. One skilled in the art will realize that the total inertia J is a combination of the engine inertia plus the reflected inertia of the wheels and the drive train, as well as the reflected inertia of the vehicle and will vary, depending upon the speed of the vehicle, transmission gear ratio.

The degree to which adaptive compensation is performed details the complexity of the specific implemention the invention. As an example, the control system 30 can be implemented to compensate for the variabilities in inertia and engine efficiency, therein requiring some type of pre-programmed logic and the use of minicomputer or micro-processor.

Figures 4, 5:
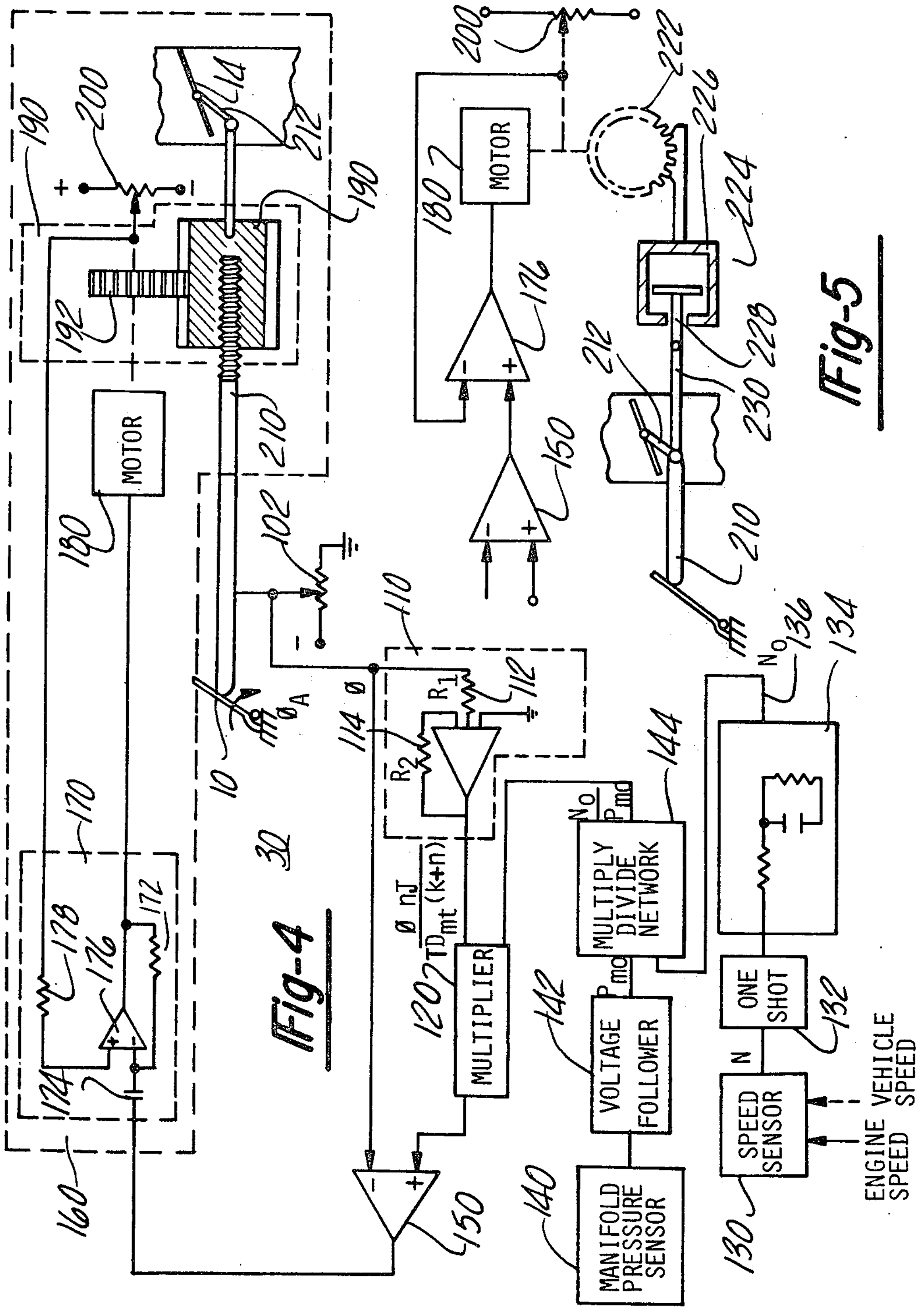
FIG. 4 is a more detailed embodiment of the control system of FIG. 3.
FIG. 5 is an alternate embodiment of the throttle positioning mechanism which is shown in FIG. 4.

Consider now the detailed embodiment of the invention as shown in FIG. 4. This controller 30 is designed to compensate for variations in dynamics attributed to engine or vehicle speed and pressure. A transducer such as a position sensor 102 such as a potentiometer is coupled to the vehicle accelerator pedal 10 to transduce its mechanical motion of the accelerator pedal 10 to an analog voltage $\theta$. The output of the potentiometer 102 is input into a scaling amplifier 110 comprising an input resistor $R_1$ (112) and a feedback resistance $R_2$ (114), wherein the relationship between $R_1$ and $R_2$ is given by equation 8.

$$\frac{R_2}{R_1} = \frac{nJ}{TD_{mt}(k+n)} \quad (8)$$

Alternatively, the scaling amplifier 110 can be replaced by a voltage divider network. The output of scaling amplifier 110 is a voltage proportional to the accelerator depression and to the variables as enumerated in equation 8. The output of scaling amplifier 110 is connected to an input terminal of multiplier 120. The multiplier 120 can be of the type such as a Multifunction Converter No. 4301 which is manufactured by the Burr Brown Corporation, Tuscon, Ariz.

An engine speed sensor 130 which generates an output proportional to the speed of an engine or vehicle speed is connected to a one shot multivibrator 132. The output of the one shot 132 is connected to an averaging network 134. The voltage 136 appearing at the output of the averaging network 134 is a voltage proportional to the average value $N_o$ of the engine or vehicle speed. This output voltage is input to an input terminal of a multiply-divide network 144. This multiply-divide network can be implemented using the Multi-function Converter 4301 or 4302 as previously described. A manifold absolute pressure sensor 140 is connected to an impedance matching voltage follower 142. The output of the voltage follower 142 is a voltage proportional to the sensed absolute pressure $P_{mo}$. The output of the voltage follower 142 is connected to another input terminal of the multiply-divide network 144. The multiply-divide network is so connected to generate an output voltage of the form $N_o$ divided by $P_{mo}$ as shown in FIGS. 3 and 4. The output of network 144 is connected to multiplier 120. The output of multiplier 120 is connected to the positive terminal of a comparator 150 which also receives the output of transducer 102 at its negative input terminal. The output of comparator 150 is connected to a derivative servo-mechanism 160. The derivative servo-mechanism 160 contains a filter network 170, servo-motor 180 and throttle correcting mechanism 190. The servo-motor 180 drives the throttle correcting mechanism 190 having an input gear 192 which is mechanically connected to a feedback device 200 such as a potentiometer. The device 200 transduces the mechanical motion of the input gear 192 into an electrical voltage which is fed back to the filter network 170.

Recalling that the present invention requires a compensation network of the form TS/(TS+1), it is required that the filter network 170, motor 180, throttle mechanism 190 and feedback transducer 200 cooperate to achieve these desired filter and response characteristics. More particularly, one skilled in the art will appreciate that the required differentiation, that is, the term TS is achieved by the resistor-capacitor combination 172, 174 which are connected to the operational amplifier 176.

It can further be appreciated that the lag network characteristics, that is, (TS+1) is achieved by connecting the transducer 200 to the operational amplifier 176 through the feedback resistor 178. To achieve the lag network dynamics, it is desirable that the motor and load dynamics be of sufficiently high frequency as compared to the time constant T so that these dynamics can be neglected.

Attention is now directed to the throttle mechanism 190 and its related components. The throttle mechanism 190 comprises an input gear 192 which drives a traveling nut 194 in response to the motion of the motor 180. The traveling nut 194 is connected to accelerator pedal 10 by a control rod 210. The traveling nut 194 is also connected to the engine throttle 14 through a crank arm 212. The outer surface of the traveling nut is formed with gear teeth adapted to mesh with the teeth of the input gear 192. The traveling nut 194 and control rod 210 are so adapted to permit the traveling nut 194 to rotate relative to the threaded end of the control rod 210 in response to the rotation of the input gear 192.

As can be seen from FIG. 4, the combined motion of the input gear 192 and traveling nut 194 is such as to convert the rotational motion of the motor 180 into a translational motion of the traveling nut in a direction co-axial to the axis of the control rod 210. The total linear motion of the traveling nut is the combination of the motion resulting from accelerator 10 depression plus the corrective motion in response to the control system operation.

As can be seen, the total angular movement of the throttle plate 14 can also be thought of as the super position of the angular motion arising from the throttle depression and the angular motion resulting from the control system operation.

Equivalents of the control rod throttle position mechanism are well known and may be preferred to better comport with forms of linkage between the accelerator pedal and engine throttle. In addition, the desired compensation network comprising the derivative filter can be implemented in forms other than that shown in FIG. 4. As an example, consider the alternate implementation of the control system shown in FIG. 5. The output of comparator 150 is applied directly to amplifier 176 rather than through a differentiating network. The motor 180 is coupled through a rack and pinion mechanism 222 to a dash pot 224 having a cylinder 226 and piston 228 slideably mounted therein. The piston 228 is connected to the crank arm 212 by the control link 230. The interconnection of the amplifier 176, motor 180 and transducer 200 combination is such as to implement the single order of lag transfer function 1/(TS+1). The required differentiation to implement the control system 300 is obtained through the linear motion of the dash pot piston 228. One skilled in the art will realize that the dash pot 224 can be represented by a dynamic transfer function of the form given in equation 9.

$$L_{out}/L_{in} = TS \quad (9)$$

Wherein $L_{in}$ is the relative displacement of the piston 228 relative to the dash pot cylinder 226. The displacement of the piston 228 adds directly to the displacement of the control arm 210, so that the overall motion of the throttle plate is as previously described, i.e. the combined motion resulting from the accelerator depression and the corrective action resulting from the control system.

Inspection of the throttle positioning mechanism 190 in FIG. 4 and the alternative embodiment in FIG. 5 reveal that the control arm 210 is directly coupled to the corrective motion resulting from the control system. It can be seen that any corrective motion of the throttle positioning mechanism will also cause movement of the accelerator pedal 10. This motion may be objectionable to certain drivers.

Figure 6:
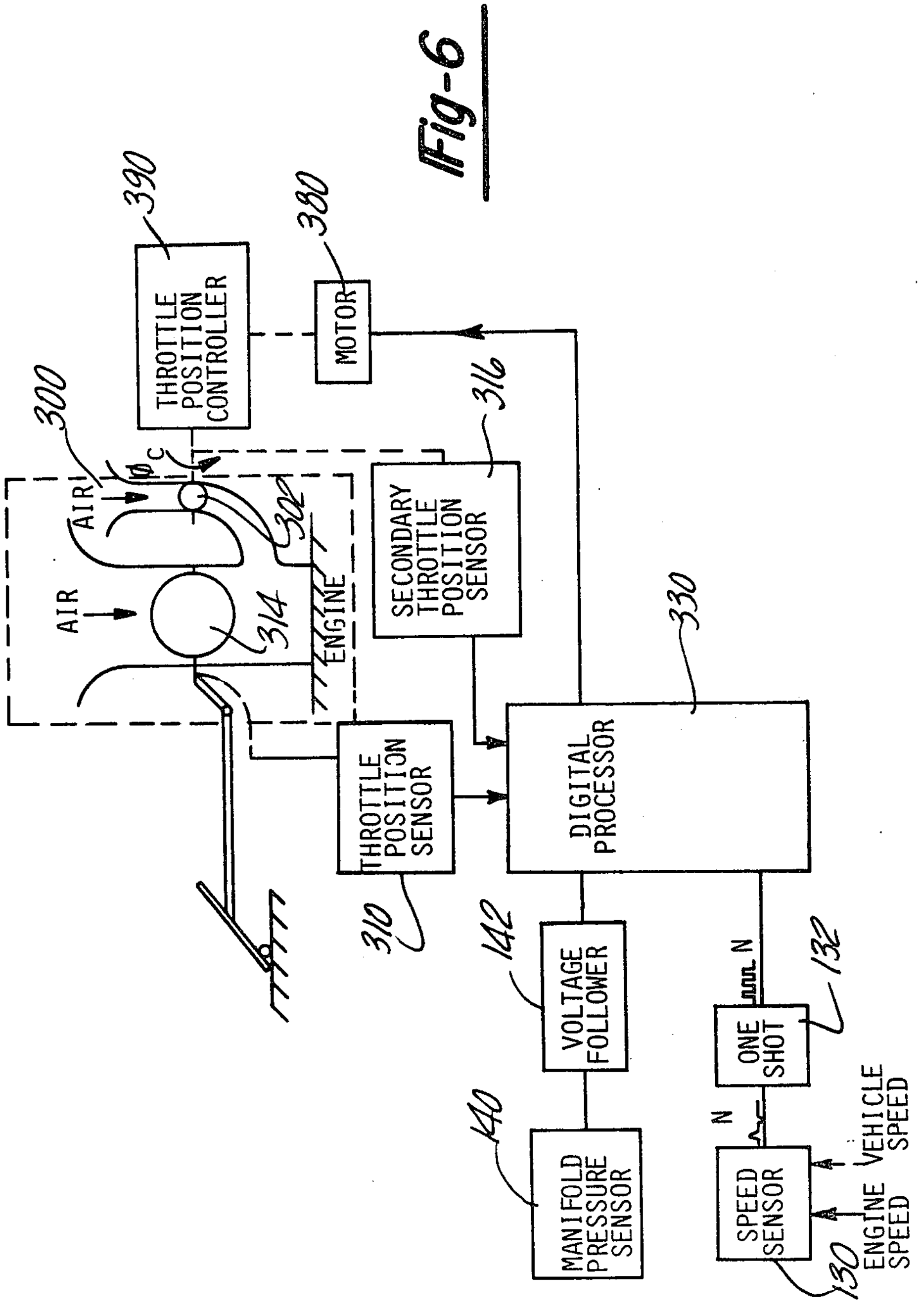
FIG. 6 illustrates a digital implementation of the present invention.

FIG. 6 shows an alternate embodiment of the throttle and throttle positioning mechanism which overcomes this problem. There is shown an intake manifold of an engine modified to receive a secondary air source 300 having a secondary throttle 302 located therein. The control system 30 is coupled only to the secondary throttle 302 thereby de-coupling the accelerator 10 from corrective motions resulting from the control system 30. In addition, FIG. 6 shows other variations of the control system. In particular, the throttle position sensor 310 is shown connected to the primary throttle 314 rather than to the accelerator pedal 10 as shown in the prior embodiments. In addition, a secondary throttle position sensor 316 is shown connected to the secondary throttle 302. The outputs of the throttle position sensor and secondary throttle position sensor 310 and 316 respectively, are connected to the input terminals of a digital processor 330. It should be apparent that because of the current state of digital electronics as reflected in their increased reliability and decreased costs, that an implementation of the control system 30 can be performed within a digital processor.

The following discussions relate to the steps necessary for a digital implementation of the control system to effect throttle corrective actions. More particularly, the digital processor 330 incorporates the functions of a number of blocks which have been previously shown in FIG. 4, more particular, the scaling network 110, multiplier 120, the multiply-divide network 144, the engine speed averaging network 134, the comparator 150, the differentiating filter and lag network filter 170.

Figure 7:
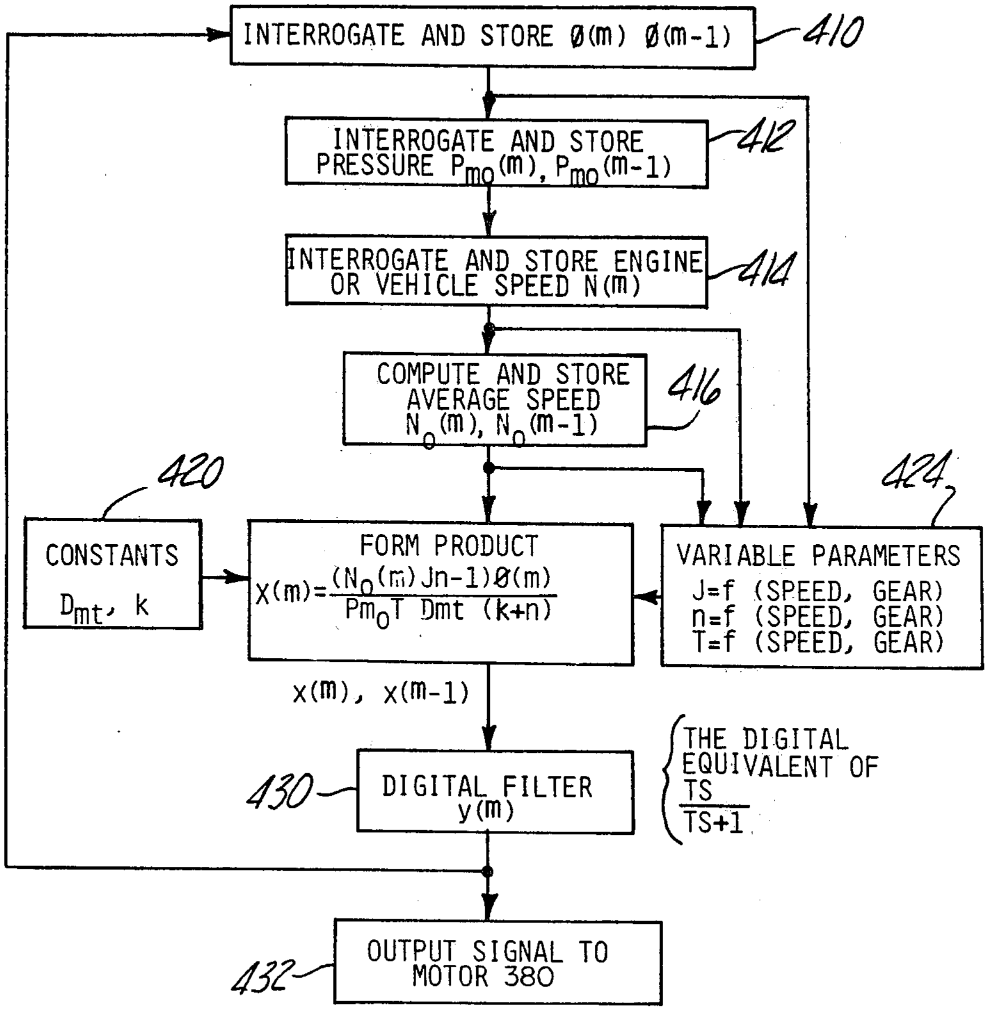
FIG. 7 is a flow diagram illustrating steps of the digital implementation.

Reference is now made to FIG. 7 which shows a flow diagram detailing the major steps necessary to digitally implement the control systems of FIGS. 4 or 6. The digital processor 330 must first interrogate and store the present value as well as have access to the past value of a number of variables. In particular, the digital processor must interrogate and store the present (i.e., the mth) and past values (m−1) of the position of the primary throttle 314 $\theta(m)$, $\theta(m-1)$, and the manifold absolute pressure $P_{mo}(m)$, $P_{no}(m-1)$ as shown in blocks 410 and 412. While FIG. 6 illustrates that the output of the secondary throttle position sensor 316 is received by the digital processor 330, this connection is only shown for the sake of generality and may be required if more complex control equations are implemented. The digital processor further requires knowledge of the engine or vehicle speed N. To achieve this information, the output of an engine speed sensor 130 as shown in FIG. 6 is input into a one shot 132 which will generate an output signal having a series of pulses the frequency of which is indicative of the engine or vehicle speed. The output of the one shot 132 is input into the digital processor 330 (block 414) wherein the digital processor will compute the present average value $N_o(m)$ of the engine speed (block 416). The digital processor 330 can now form an intermediate variable x(m) as shown in block 418 and given by $X(m)=(N_o(m)Jn1)\phi(m)/P_{mo}TD_{mt}(k+n)$. It is apparent that because of the increased flexibility afforded by the digital processor each term of the intermediate variable x(m) can be a variable depending upon variables such as time or speed or gear ratio. To emphasize this fact, the intermediate variable x(m) is shown as a composite of constants of block 420 and variable parameters 424 as well as those external parameters, throttle position, pressure and engine speed. During the $m^{th}$ iteration, the digital processor will compute the value of x(m). Upon forming the intermediate variable x(m), the digital processor forms the digital equivalent y(m) to a differentiating and lag network as previously discussed in FIG. 4. The output of digital filter y(m) is essentially the equivalent of the analog signal necessary to drive the motor 180 of FIG. 4.

The output of the digital filter y(m) is input to a servo motor 380 as shown in block 432 of FIG. 7 and is drivably connected to the throttle position controller 390 of FIG. 6, which in turn moves the secondary throttle 302. It should be apparent that the output of the motor 380 is proportional to the correction angle $\theta_c$. One such throttle position controller 390 that may be utilized with a plural throttle embodiment and which takes advantage of this proportionality is to directly drive the throttle 302 through the motor 380. It should be recalled that an object of the plural throttle embodiment is to decouple any corrective motion from being fed back to the operation through the control arm 210. Consequently, the throttle positioning mechanism illustrated in FIG. 4 can be used, with certain modification, to control the position of the secondary throttle 302.

As an example, the motor 380 can be connected to the throttle mechanism 190 of FIG. 4 which would drive the secondary throttle 302 through a connection such as the crank arm 210. The control rod 210 would be decoupled from the accelerator 10 and mounted in a fixed position.

In addition it should be apparent that one may also use the non-digital system of FIG. 4 to position the secondary throttle 302. However, this also would require similar modification to the throttle positioning mechanism including the use of a directly driven throttle or the decoupling of the control rod 210 as described above.

The following discussions relate to the digital synthesis of the analog network TS/(TS+1). It should be apparent that a digital processor does not differentiate. However, it is possible to formulate a difference equation which would approximate the dynamics of the differentiation as well as the dynamics of an analog lag network.

Referring now to equation 10, there is shown a difference equation which yields the digital equivalent to an analog network of the previously mentioned form. More particular, the present value of the output of the digital filter y(m) can be represented by a scalar equation which is a function of the past value of the output, that is y(m−1) and the present and past values of the intermediate variable x(m), and x(m−1). In addition, the present value of the output y(m) is a function of parameters A & B.

$$e_o = \frac{TS}{TS+1} e_{in};\ y(m) = A\,y(m-1) + B\,(x(m) - x(m-1)) \quad (10)$$

where:

$$A = e^{-t/T};\ B = \frac{1 - e^{-t/T}}{t/T};\ X(m) = \frac{(No(m)Jn - 1)\theta(m)}{P_{mo}D_{mt}T}$$

Both A & B are functions of the computational cycle time t and the desired time constant T. If the time constant T is a variable, (see block 424), this variability will automatically be accounted for in the implementation of the digital filter 430. During each iterative cycle, the signal y(m) is output to the motor 380 as shown in block 432.

While the digital embodiment of the invention described in FIG. 6 implements both the differentiation and lag functions of equation 5 one skilled in the art will appreciate that the digital processor 330 offers many implementation alternatives. As an example, the digital processor 330 could be programmed, using known digital filtering techniques, to implement only the lag function 1/(TS+1) while the differentiation function TS would be implemented using a rack and pinion mechanism, as illustrated in FIG. 5, with minor modifications. As an example, the output of the digital processor 330 would drive a motor such as motor 380 which in turn would drive the dashpot 224 through the rack and pinion mechanism 222. Obviously the rack and pinion mechanism of FIG. 5 does not require a connection to the accelerator 10 and hence the control arm 210 of FIG. 5 may be removed. It may be desirable however to replace the control rod 210 and accelerator 10 with a spring (not shown).

In view of the aforementioned it should be apparent that the analog system of FIG. 5 may also be used in the plural throttle situation by similarly eliminating the movable control rod 210 connection.

Many changes and modifications in the above described embodiments of the invention can, of course, be carried out without departing from the scope thereof. Accordingly, that scope is intended to be limited only by the scope of the appended claims.

What is claimed is:

1. In a vehicle powered by an internal combustion engine having a moveable throttle for determining the vehicle speed and a control linkage for setting the position of said throttle in response to operator commands, and a second throttle means for improving the driveability of the automobile, comprising:

means providing a first signal indicative of the position of said throttle set by said control linkage;

first multiplying means for multiplying said first signal by a factor which is determined by parameters of the vehicle and providing an output proportional to the product thereof;

second multiplying means for multiplying the output of said first multiplying means by a factor which is constituted by the quotient of a variable indicative of vehicle speed divided by the manifold absolute pressure of the vehicle engine and providing an output proportional to the product thereof;

means providing the difference between said first signal and the output of said second multiplying means;

differentiating means providing an output proportional to the derivative with respect to time of said output of said difference means;

control means responsive to the output of said differentiating means for modifying the last named output in accordance with the desired dynamics of the engine and vehicle; and means for positioning said second throttle in proportion to the output of said control means.

2. The device of claim 1 wherein said factor of said first multiplying means includes a factor constituted by the ratio of the automobile inertia J to a factor related to the torque of said engine.

3. The device of claim 1 wherein said positioning means comprises a position type servo providing a rotary displacement output proportional to the output of said central means.

4. The device as defined in claim 3 wherein said positioning means further includes:

means for converting said rotary displacement to a linear displacement for changing the position of said second throttle.

5. A device as claimed in claim 4 wherein said converting means includes a displaceable control rod, and a rotary member threadably connected to said control rod and to said servo.

6. In a vehicle powered by an internal combustion engine having a moveable throttle for determining the vehicle speed and a control linkage for setting the position of said throttle in response to operator commands and a second throttle, means for improving the driveability of the automobile comprising:

means providing first signal indicative of the position of said throttle set by said control linkage;

first multiplying means for multiplying said throttle position signal by a factor which is determined by parameters of the vehicle and providing an output proportional to the product thereof;

second multiplying means for multiplying the output of said first multiplying means by a variable factor which is constituted by the quotient of a variable indicative of vehicle speed divided by the manifold pressure of the vehicle engine and providing an output proportional to the product thereof;

means providing the difference between said first signal and the output of said second multiplying means;

means providing a first displacement output proportional to the output of said difference means;

control means responsive to the output of said difference means for modifying the last named output in accordance with the desired dynamics of the engine and vehicle;

means providing a second displacement output proportional to the derivative with respect to time of said first displacement output, and means for positioning said second throttle in proportion to said second displacement output.

7. A device as claimed in claim 6 wherein said means providing a first displacement output comprises:

a servomotor providing a rotary displacement proportional to the output of said difference means; and means for converting said rotary displacement to a linear displacement constituting said first displacement.

8. A device as claimed in claim 7 wherein said means providing a second displacement comprises a dash pot and where said means for positioning said second throttle includes a linkage member connecting said dash pot to said second throttle.

9. A device as claimed in claim 7 wherein said converting means comprises a rack and pinion mechanism.

10. In a vehicle powered by an internal combustion engine having a moveable throttle for determining the vehicle speed and a control linkage for setting the position of said throttle and a second throttle; means for improving the driveability of the automobile comprising:

an electrical sensor providing a signal proportional to the position of said control linkage;

scaling means to which said sensor signal is applied for altering the amplitude of said sensor signal by a factor which is determined in part by the ratio of the inertia of said automobile to a factor related to the torque of said engine;

means providing a signal related to the speed of said automobile;

means for multiplying the output of said scaling means by said automobile speed signal;

means providing a signal related to the manifold absolute pressure of said engine;

means for dividing the output of said multiplying means by said pressure signal;

means providing the difference between the output of said dividing means and said sensor signal;

means providing a displacement which is proportional to the time derivative of the output of said difference means;

and means for positioning said second throttle in proportion to the output of said displacement means.

11. A device as claimed in claim 10 wherein said means providing a displacement comprises:

means for differentiating with respect to time the output of said difference means; and a position servo providing an output displacement proportional to the output of said differentiating means.

12. A device as claimed in claim 10 wherein said means providing a displacement comprises:

a position servo providing a displacement proportional to the output of said difference means, and means providing a displacement output which is proportional to the time derivative of the displacement output of said servo.

13. A device as claimed in claim 11 wherein said differentiating means comprises a capacitor.

14. A device as claimed in claim 12 wherein said last named means comprises a dash pot connected to said second throttle.

* * * * *